United States Patent
Trojek et al.

(10) Patent No.: US 8,222,623 B2
(45) Date of Patent: Jul. 17, 2012

(54) GENERATION OF QUANTUM-CORRELATED AND/OR POLARIZATION ENTANGLED PHOTON PAIRS WITH UNEQUAL WAVELENGTHS

(75) Inventors: Pavel Trojek, Eching (DE); Harald Weinfurter, Munich (DE)

(73) Assignee: qutools GmbH, Munich (DE)

( * ) Notice: Subject to any disclaimer, the term of this patent is extended or adjusted under 35 U.S.C. 154(b) by 420 days.

(21) Appl. No.: 12/530,325

(22) PCT Filed: Mar. 6, 2008

(86) PCT No.: PCT/IB2008/050815
§ 371 (c)(1), (2), (4) Date: Nov. 25, 2009

(87) PCT Pub. No.: WO2008/107852
PCT Pub. Date: Sep. 12, 2008

(65) Prior Publication Data
US 2010/0111541 A1    May 6, 2010

Related U.S. Application Data

(60) Provisional application No. 60/893,747, filed on Mar. 8, 2007.

(51) Int. Cl.
*G02F 1/35* (2006.01)
*G02F 1/39* (2006.01)
*G01N 21/63* (2006.01)

(52) U.S. Cl. ............ 250/493.1; 257/21; 257/14; 257/9; 356/317; 356/318; 356/417; 356/432; 356/484; 359/326

(58) Field of Classification Search ............... 250/493.1; 257/21, 14, 9; 356/317, 318, 417, 432, 484; 359/326
See application file for complete search history.

(56) References Cited

U.S. PATENT DOCUMENTS

| | | | |
|---|---|---|---|
| 6,424,665 B1 * | 7/2002 | Kwiat et al. | 372/21 |
| 7,211,812 B2 * | 5/2007 | Takeuchi | 250/493.1 |
| 7,570,419 B2 * | 8/2009 | Edamatsu et al. | 359/326 |
| 7,683,361 B2 * | 3/2010 | Edamatsu et al. | 257/13 |
| 2011/0051227 A1 * | 3/2011 | Arahira | 359/328 |

OTHER PUBLICATIONS

Daniel Ljunggren, Maria Tengner, Philip Marsden, and Matthew Pelton, Theory and Experiment of Entanglement in a Quasi-phase-matched Two-crystal Source, The American Physical Society, Mar. 20, 2006, pp. 032326-1 to 032326-12, Physical Review A 73, 032326 (2006).

(Continued)

*Primary Examiner* — Nikita Wells
(74) *Attorney, Agent, or Firm* — Raymond R. Ferrera; Adams and Reese LLP

(57) ABSTRACT

The invention provides an apparatus and method for generating quantum-correlated and/or polarization-entangled photon pairs with unequal wavelengths. The photon pairs generated collinearly with respect to the pump light via a nonlinear process in a nonlinear optical medium are collected into a single mode fiber and split using a dichroic device. The wavelengths of photons constituting a pair are selected such that, first, their efficient propagation in the same single mode optical fiber, and second, their efficient splitting with high switching ratio, is possible. A detected rate $\sim 10^5$-$10^6$ pairs/s and >98% quantum interference visibility of polarization entanglement is observed. This source, given its performance, robustness and minimum alignment requirements is ideal for quantum communication schemes, in particular for entanglement-based quantum cryptography.

15 Claims, 4 Drawing Sheets

OTHER PUBLICATIONS

Friedrich Konig, Elliott J. Mason and Franco N.C. Wong, Single-spatial Mode Coincidence Measurement of Photon Pairs from a Highly Nondegenerate PPLN Downconverter, QTUB5, pp. 1-2.

Yun-Kun Jiang and Akihisa Tomita, Highly Efficient Polarization-entangled Photon Source Using Periodically Poled Lithium Niobate Waveguides, Optics Communications, May 26, 2006, pp. 278-281, Optics Communications 267 (2006).

Paul G. Kwiat, Klaus Mattle, Harald Weinfurter, and Anton Zeilinger, New High-Intensity Source of Polarization-Entangled Photon Pairs, The American Physical Society, Dec. 11, 1995, pp. 4337-4342, vol. 75, No. 24.

Christian Kurtsiefer, Markus Oberparleiter, and Harald Weinfurter, High-efficiency Entangled Photon Pair Collection in Type-II Parametric Fluorescence, The American Physical Society, Jul. 2, 2001, pp. 023802-1 to 023802-4, Physical Review A, vol. 64, 023802.

Paul G. Kwiat, Edo Waks, Andrew G. White, Ian Appelbaum, and Philipp H. Eberhard, Ultrabright Source of Polarization-entangled Photons, The American Physical Society, Aug. 1999, pp. R773-R776, vol. 60, No. 2.

Markus Oberparleiter and Harald Weinfurter, Cavity-enhanced Generation of Polarized-entangled Photon Pairs, Optics Communications, Sep. 1, 2000, pp. 133-137, Optics Communications 183 (2000).

J.B. Altepeter, E.R. Jeffrey, and P.G. Kwiat, Phase-compensated Ultra-bright Source of Entangled Photons, Optics Express, Oct. 31, 2005, pp. 8951-8959, vol. 13, No. 22.

Marco Fiorentino, Christopher E. Kuklewicz, and Franco N.C. Wong, Source of Polarization Entanglement in a Single Periodically Poled KTiOPO4 Crystal With Overlapping Emission Cones, Optics Express, Jan. 10, 2005, pp. 127-135, vol. 13, No. 1.

Taehyun Kim, Marco Fiorentino, and Franco N.C. Wong, Phase-stable Source of Polarization-entangled Photons Using a Polarization Sagnac Interferometer, The American Physical Society, Jan. 11, 2006, pp. 012316-1 to 012316-5, Physical Review A 73, 012316 (2006).

Xiaoying Li, Paul L. Voss, Jay E. Sharping, and Prem Kumar, Optical-Fiber Source of Polarization-Entangled Photons in the 1550 nm Telecom Band, The American Physical Society, Feb. 9, 2005, pp. 053601-1 to 053601-4, PRL 94, 053601 (2005).

O Alibart, J Fulconis, G K L Wong, S G Murdoch, W J Wadsworth, and J G Rarity, Photon Pair Generation Using Four-Wave Mixing in a Microstructured Fibre: Theory Versus Experiment, New Journal of Physics, May 15, 2006, pp. 1-20, New Journal of Physics 8 (2006) 67.

R.M. Stevenson, R.J. Young, P. Atkinson, K. Cooper, D.A. Ritchie, and A.J. Shields, A Semiconductor Source of Triggered Entangled Photon Pairs, Nature Publishing Group, Jan. 12, 2006, pp. 179-182, vol. 439.

* cited by examiner

GENERATION OF QUANTUM-CORRELATED AND/OR POLARIZATION ENTANGLED PHOTON PAIRS WITH UNEQUAL WAVELENGTHS

This application is the National Stage of International Application No. PCT/IB2008/050815, filed Mar., 6, 2008, which claims the benefit of U.S. Provisional Application No. 60/893,747, filed Mar. 8, 2007.

FIELD OF THE INVENTION

The present invention relates to photon sources and more particularly, relates to sources for producing quantum-correlated and/or polarization-entangled photon pairs used in quantum communication schemes such as in entanglement-based quantum-key distribution.

BACKGROUND OF THE INVENTION

Efficient generation of quantum-correlated or entangled photon pairs is of paramount importance for several applications of quantum communication and quantum metrology. In particular, quantum cryptography profits significantly when the schemes exploiting entangled photons are applied. For the practical implementation of cryptographic schemes, the polarization encoding of entangled-photon pairs showed to be the best choice mainly due to availability of simple and efficient polarization-control elements and analyzers. The source suitable for the realization of the industrial prototypes of entanglement-based quantum cryptography or possibly other applications of quantum communication has to have a high performance and furthermore has to fulfill several additional requirements regarding compactness, simplicity and robustness of design, as well as low operation costs or "push-button" operation requiring minimum alignment.

Since the first demonstration of a source producing polarization-entangled photon pairs based on an atomic decay in the beginning of the 80's, a wealth of theoretical proposals and experimental prototypes have been reported. To date, the most effective way how to produce entangled photon pairs showed to be via second-order ($X^{(2)}$) nonlinear processes in crystals and third-order ($X^{(3)}$) nonlinear processes in fibers. Due to very advanced stage of possible applications, such as quantum cryptography, the present development of the sources focuses largely on their simplification and miniaturization while keeping their performance on a high level. The performance of sources can be quantified in terms of their brightness (and spectral brightness), measured conveniently as number of detected pairs per second and milliwatt of pump power (and per nanometer of spectral bandwidth) and the achieved quantum-interference visibility of polarization-entanglement.

The background information together with the state-of-the-art relevant for the present invention is documented in the following patents and other publications:

[1] New high-intensity source of polarization-entangled photon pairs, P. G. Kwiat, K. Mattle, H. Weinfurter, A. Zeilinger, A. V. Sergienko, and Y. H. Shih, Phys. Rev. Lett. 75, 4337 (1995).
[2] High-efficiency entangled photon pair collection in type-II parametric fluorescence, C. Kurtsiefer, M. Oberparleiter, H. Weinfurter, Phys. Rev. A 64, 023802 (2001).
[3] U.S. Pat. No. 6,424,665 Ultra-bright source of polarization-entangled photons, P. G. Kwiat, P. H. Eberhard, A. G. White.
[4] Ultra-bright source of polarization-entangled photons, P. G. Kwiat, E. Waks, A. G. White, I. Appelbaum, P. H. Eberhard, Phys. Rev. A 60, R773 (1999).
[5] U.S. Pat. No. 6,982,822 High-flux entangled photon generation via parametric processes in a laser cavity, M. C. Teich, B. E. A. Saleh, A. V. Sercienko, J. T. Fourkas, R. Wolleschensky, M. Kempe, M. C. Booth.
[6] Cavity-enhanced generation of polarization-entangled photon pairs, M. Oberparleiter, H. Weinfurter, Opt. Commun. 183, 133 (2000).
[7] Phase-compensated ultra-bright source of entangled photons, J. B. Altepeter, E. R. Jeffrey, P. G. Kwiat, Opt. Express 13, 8951 (2005).
[8] EP 1 477 843 A1 Entanglement photon pair generator, S. Takeuchi.
[9] Source of polarization entanglement in a single periodically poled KTiOPO$_4$ crystal with overlapping emission cones, M. Fiorentino, C. E. Kuklewicz, and F. N. C. Wong, Opt Express 13, 127 (2005).
[10] Theory and experiment of entanglement in a quasi-phase-matched two-crystal source, D. Ljunggren, M. Tengner, P. Marsden, and M. Pelton, Phys. Rev. A 73, 032326 (2006).
[11] Phase-stable source of polarization-entangled photons using a polarization Sagnac interferometer T. Kim, M. Fiorentino, F. N. C. Wong, Phys. Rev A 73, 012316 (2006).
[12] U.S. Pat. No. 6,897,434 All-fiber photon-pair source for quantum communications P. Kumar, M. Fiorentino, P. L. Voss, and J. E. Sharping.
[13] Optical-fiber source of polarization-entangled photons in the 1550 nm telecom band X. Li, P. L. Voss, J. E. Sharping, and P. Kumar, Phys. Rev. Lett. 94, 053601 (2005).
[14] Photon pair generation using four-wave mixing in a microstructured fibre: theory versus experiment, O. Alibart, J. Fulconis, G. K. L. Wong, S. G. Murdoch, W. J. Wadsworth, J. G. Rarity, N. J. Phys. 8, 67 (2006).
[15] JP2005257941 Entangled photon pair generating device and its method, I. Yasushi.
[16] WO2005103810 Method for generating quantum-entangled photon pair K. Edamatsu, T. Itoh.
[17] A semiconductor source of triggered entangled photon pairs, R. M. Stevenson, R. J. Young, P. Atkinson, K. Cooper, D. A. Ritchie, A. J. Shields, Nature 439, 179 (2006).

To date, the simplest and the most established way how to generate entangled photon pairs is parametric fluorescence (spontaneous parametric down-conversion, SPDC) in second-order ($X^{(2)}$) nonlinear materials. In this process photons of an intense pump beam spontaneously convert in a nonlinear optical crystal with a low probability into two daughter photons. Energy and momentum conservation ensures that the emitted photons exhibit nonclassical correlations in these two continuous degrees of freedom. Via [1-4] two basic methods are known how to obtain polarization-entanglement from SPDC. The first uses type-II phase-matching (i.e. the emitted photons are mutually orthogonally polarized) in non-collinear geometry (i.e. generated fluorescence photons propagate in directions not identical with the propagation direction of pump photon) and the second makes use of two crossed type-I phase-matched nonlinear crystals (i.e. two identically polarized photons can be produced in either crystal) in non-collinear geometry. These sources are inherently wide band, generally low brightness and require careful alignment.

Various variations of the original proposals were published over the past few years. References [5] and [6] present the method to increase the intensity of pump field for SPDC by confinement the nonlinear crystal in a cavity. Reference [7] shows that the use of special birefringent compensation elements can increase the collected usable solid angle of the down-conversion light. Patent publication [8] disclose the method how to converge the down-conversion light extensively generated in a wide solid angle in a beam shape leading to a higher coupling efficiency into single-mode fibres. Particularly promising, as reported in [9-11], show to be the methods, where conventional nonlinear crystals are exchanged by quasi-phase matched periodically poled crystals. This enables the access to higher nonlinear coefficients and thus better conversion efficiency of pump photons into down-conversion photons. In general, all the aforementioned variations enhanced the performance of the sources, particularly regarding their brightness, however often at the expense of their bigger complexity, increased costs and higher demand for alignment.

A great drawback, limiting the performance and flexibility of all aforementioned sources is that two separate spatial modes defined by coupling optics, irises or single-mode fibres are used for collecting fluorescence photons. High-purity polarization entanglement can be obtained only if the divergences of these modes and also their mutual spatial orientations are perfectly matched. Consequently, a careful alignment of all the optics defining collection modes, is always required.

With respect to brightness and integration into communication fibre networks, promising sources of correlated photon pairs were disclosed in publications [12-14]. There, the correlated photon pairs at unequal wavelengths were generated via four-wave mixing process in optical fibres with nonzero third-order ($X^{(3)}$) nonlinearity. The polarization-entangled photon pairs can be obtained using counter propagating pumping of a straight fibre or a fiber Sagnac loop, in accordance with [15]. Due to significant Raman background requiring careful filtering of correlated photons, and particularly, the need of mode-locked picosecond lasers for pumping four-wave mixing process, the sources are complex and financially demanding.

Other currently pursued way how to generate entangled photon pairs, namely decay processes in quantum dots or other semiconductor structures [16, 17], were not successful, and no entanglement or entanglement of a poor quality was observed till now.

It is an object of the present invention to provide an improved apparatus for the generation of polarization-entangled photon pairs and method for such generation, overcoming the deficiencies of the prior art, including those outlined above.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF FIGURES

The accompanying drawings illustrate the embodiments of the present invention and, together with the detailed description, serve to explain the principles of the present invention. In the drawings.

DETAILED DESCRIPTION OF THE INVENTION

The present invention provides a novel apparatus and method for generating quantum-correlated and/or polarization-entangled photon pairs with unequal wavelengths. Here, photon pairs are said to be correlated if they exhibit tight correlations in some degree of freedom, such as in time, in propagation direction, in energy etc., but their quantum mechanical polarization state is separable. Photon pairs are said to be polarization entangled if their quantum mechanical polarization state is not separable.

Figure 1:
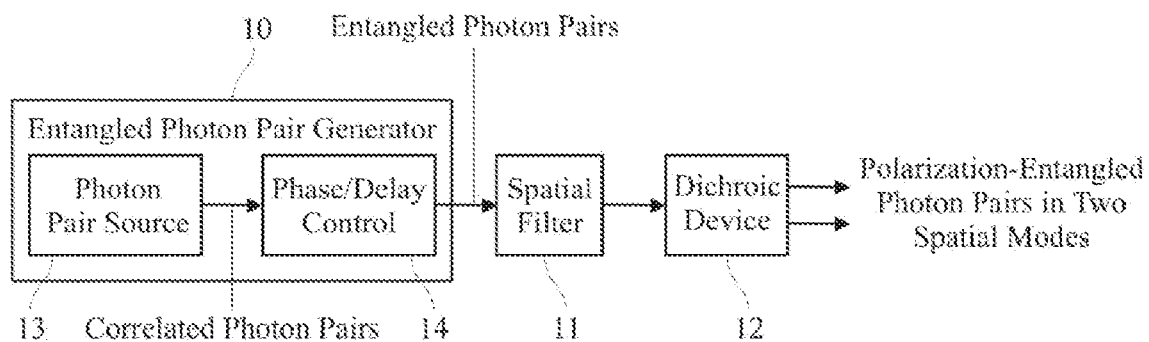
FIG. 1 illustrates the block diagram of the invention.

Referring to FIG. 1, there is shown a block diagram of a system for the generation of the polarization-entangled photon pairs in accordance with the present invention. The system includes an entangled photon pair generator 10, a spatial filter 11 and a dichroic device 12. The entangled photon pair generator 10 comprises a photon pair source 13 and a phase/delay control 14.

The photon pair source 13 emits pairs of photons correlated in time and in propagation direction. Every emitted photon must be randomly polarized along one of two predetermined orthogonal directions. The predetermined orthogonal directions may be horizontal and vertical direction, or other similar directions. The polarization of every emitted photon must be perfectly correlated/anti-correlated with the polarization of the other photon from a pair. The term "polarization correlation" refers to the situations where the photons from a pair have the same polarizations, i.e. for example, they are both horizontally or vertically polarized. The term "polarization anti-correlation" refers to the situations where the photons from a pair have the orthogonal polarizations, i.e. for example, one photon is polarized horizontally but the other vertically. Furthermore, for the purpose of the present invention, the emitted photons must have unequal, i.e. nondegenerate, wavelengths. The photon pair source may include an optical source of light, which impinges on a nonlinear optical medium and produces pairs of photons via a nonlinear process. The source of the pump light may be a laser, semiconductor laser, light-emitting diode or other similar source. The light may be continuous-wave or pulses of, for example femtosecond or longer duration. The light preferably has energy in the ultra-violet, visible or infrared wavelength range. The nonlinear optical medium may be a crystal, a surface, an interface or other medium with nonzero second-order or higher-order nonlinearity and allowing for nondegenerate phase-matching. Instead of phase-matched nonlinear optical media, quasi-phase matched nonlinear optical media can be used as well. The nonlinear process may be a spontaneous parametric down conversion (SPDC) or other similar nonlinear process.

The phase/delay control 14 provides means for the adjustment of the mutual phase/time relation between the orthogonally polarized photons provided by the photon pair source 13. It enables coarse tuning of the time delay between the photons. For a particular setting of the time delay the mutual indistinguishability of the orthogonally polarized photons with nondegenerate wavelengths can be ensured in the time domain. Furthermore, the phase/delay control enables introducing of any desired polarization dependent phase shift between zero and 360 degrees. The phase/delay control might include wave retarders, birefringent optical materials, electro-optic modulators, acousto-optic modulators, or other similar components and devices.

The spatial filter 11 provides means for selecting photon pairs belonging to a well-defined spatial optical mode. It ensures that the orthogonally polarized photons provided by the entangled photon pair generator 10 are spatially indistinguishable. The spatial filter might be a single-mode fibre supporting the guiding of the photons with nondegenerate wavelengths, irises, pinholes or other spatial filters.

The dichroic device 12 provides means for splitting of nondegenerate photons from a pair into spatially distinct modes based on their different wavelengths. I.e., the dichroic device allows mapping of two different wavelengths onto two distinct spatial modes with a high isolation. The isolation is measured as a ratio of light at an undesired wavelength relative to the desired wavelength in a given output port of the dichroic device. The dichroic device might be a wavelength division multiplexer, a dichroic mirror, a prism, a grating or other optical component separating the different wavelength bands.

Ensuring a high degree of time and spatial indistinguishability using the phase/delay control 14 and the spatial filter 11, respectively, of the orthogonally polarized photons provided by the photon pair source 13, is indispensable for achieving high purity polarization entanglement. For the case of ideal indistinguishability, the polarization state of an emitted photon pair is maximally entangled and can be quantum-mechanically described as $$\frac{1}{\sqrt{2}}(|0\rangle|0\rangle + e^{i\varphi}|1\rangle|1\rangle) \text{ or } \frac{1}{\sqrt{2}}(|0\rangle|1\rangle + e^{i\varphi}|1\rangle|0\rangle).$$

Here, each polarized photon represents a two-level quantum mechanical system with basis vectors $|0\rangle$ and $|1\rangle$, which are associated with the predetermined orthogonal polarizations such as horizontal and vertical polarization, respectively. The relative phase $\varphi$ is determined by the details of the emission process and all the optical components in the path of emitted photon pairs and can be adjusted using the phase/delay control 14.

The state $$\frac{1}{\sqrt{2}}(|0\rangle|0\rangle + e^{i\varphi}|1\rangle|1\rangle)$$

corresponds to the case where the photons from a pair have correlated, i.e. the same, polarizations and the state $$\frac{1}{\sqrt{2}}(|0\rangle|1\rangle + e^{i\varphi}|1\rangle|0\rangle)$$

corresponds to the case where the photons from a pair have anti-correlated, i.e. orthogonal, polarizations. Due to the fact that the photons have unequal wavelengths, in the following represented by symbols $\lambda_1$ and $\lambda_2$, the quantum state of the photon pair can be written as $$\frac{1}{\sqrt{2}}(|0\rangle_{\lambda_1}|0\rangle_{\lambda_2} + e^{i\varphi}|1\rangle_{\lambda_1}|1\rangle_{\lambda_2})$$

or $$\frac{1}{\sqrt{2}}(|0\rangle_{\lambda_1}|1\rangle_{\lambda_2} + e^{i\varphi}|1\rangle_{\lambda_1}|0\rangle_{\lambda_2}),$$

where $\lambda_1$ and $\lambda_2$ provide labeling of two qubits. The dichroic device 12 provides mapping of the wavelengths $\lambda_1$ and $\lambda_2$ onto two distinct spatial modes, in the following represented by symbols 1 and 2, respectively. Thus, the quantum state of photon pairs in polarization degree of freedom after the dichroic device 12 is written as $$\frac{1}{\sqrt{2}}(|0\rangle_1|0\rangle_2 + e^{i\varphi}|1\rangle_1|1\rangle_2)$$

or $$\frac{1}{\sqrt{2}}(|0\rangle_1|1\rangle_2 + e^{i\varphi}|1\rangle_1|0\rangle_2).$$

It should be noted that the disclosed method inherently produces true polarization entangled photon pairs without any need for some kind of a post-selection. The described approach is fundamentally different from the concept used in most collinear sources of polarization-entangled photon pairs of prior art. For example, in the publication "Einstein-Podolsky-Rosen-Bohm experiment using pairs of light quanta produced by type-II parametric down-conversion", T. E. Kiess, Y. H. Shih, A. V. Sergienko, and C. O. Alley, Phys. Rev. Lett. 71, 3893 (1993), actually product polarization states are directly produced by the source and entanglement is achieved by post-selecting the half of the total states detected. According to the present invention, however, the spectral information of the photon pairs emitted from the entangled photon pair generator 10 is exploited for a direct and more efficient production of polarization-entangled states. In general, by excluding the phase/delay control 14 from the system of FIG. 1, the method will produce correlated photon pairs, which will not be entangled at all in polarization degree of freedom or only partly.

Figure 2:
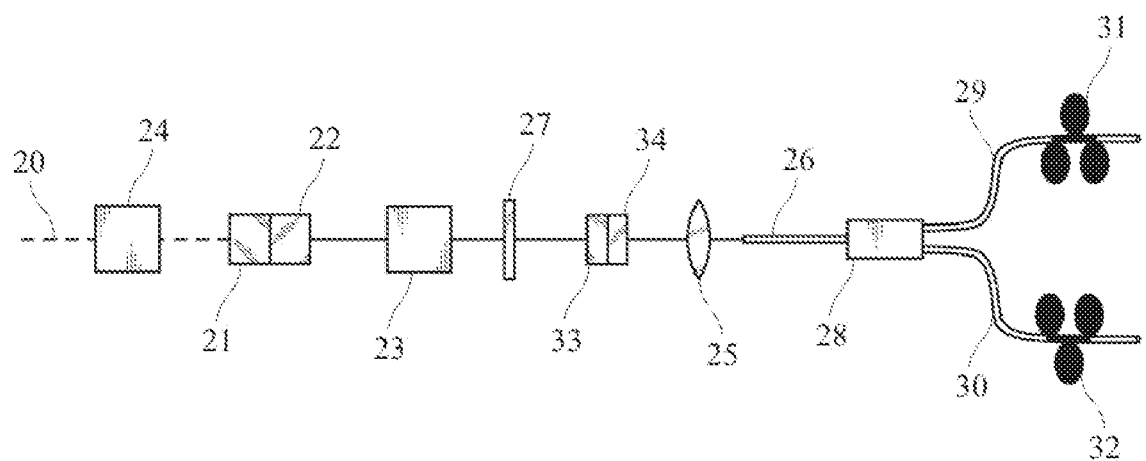
FIG. 2 illustrates the preferred embodiment of the apparatus of the present invention.

Referring to FIG. 2, there is shown a schematic diagram of a preferred embodiment of the apparatus for the generation of polarization-entangled photon pairs at nondegenerate wavelengths.

Entangled photon pairs are produced by pumping an optical nonlinear medium via the SPDC process. As nonlinear medium, two adjacent nonlinear crystals 21, 22, both operated in type-I phase-matching configuration and pumped with linearly polarized light 20 are used. The crystals are oriented such that the principal plane, i.e. the plane containing the crystal optic axis and the wave vector of the pump light, of the first crystal 21 is perpendicular to the principal plane of the second crystal 22. Due to the type-I phase-matching, the down-conversion process occurs only in the crystal, where a pump photon is extraordinary polarized, i.e. polarized in the principal plane of the crystal. The resulting fluorescence photons have then ordinary polarization, i.e. the polarization normal to the principal plane. By pumping the crystals with light, linearly polarized at 45° with regard to principal planes of the crystals, there is an equal probability that a pump photon will be down-converted in either crystal. The nonlinear crystals are operated in nondegenerate, collinear phase-matching configuration. This means that fluorescence photons with unequal wavelengths are emitted from both crystals collinearly with the pump beam. Such an operation can be achieved by tilting the suitably cut nonlinear crystals 21, 22.

Due to birefringence and dispersion in the nonlinear crystals 21 and 22, the group velocities of the created photons depend on their polarization and their wavelength. Therefore, according to arrival times of fluorescence photons at the output face of the crystal 22, it is in principle possible to ascertain, whether a photon pair was produced in the first or the second crystal. This effect lowers the quality of produced polarization entanglement as the full coherence between the two possible emission processes is lost. To counteract the effect a birefringent compensation element 23 must be included in the path of fluorescence photons. Moreover, the pump light 20 must have a narrow spectral linewidth or a given polarization dependent phase/delay must be introduced to the pump light using another birefringent compensation element 24.

The spatial distribution of fluorescence photons emitted from the nonlinear crystals 21, 22 is matched to a spatial optical mode of single-mode fibre 26 using a lens 25. The propagation of photons in the same spatial optical mode determined by the single-mode fibre precludes the existence of any spatial effect potentially worsening the quality of polarization entanglement. To filter out the photons from the pump beam, a band-pass filter 27 with a high transmission for the wavelengths of fluorescence photons and a high reflection for the wavelength of pump photons is placed in front of the single-mode fibre.

The fluorescence photons are directly guided to wavelength division multiplexer 28, where the photons at nondegenerate wavelengths are split into two distinct spatial modes determined by the single-mode fibres 29 and 30. Both output fibres from wavelength division multiplexer are provided with the polarization controllers 31 and 32 to compensate the polarization effect of wavelength division multiplexer and the birefringence of fibres.

Providing time and spatial indistinguishability between the orthogonally polarized photons emitted from nonlinear crystals 21, 22 using the birefringent compensation elements 23, 24 and the single-mode fibre 26, respectively, ensure that the two emission processes are coherent with one another. Therefore, the polarization state of the fluorescence photon pair is maximally entangled and can be quantum-mechanically described as $$\frac{1}{\sqrt{2}}(|0\rangle_{\lambda_1}|0\rangle_{\lambda_2} + e^{i\varphi}|1\rangle_{\lambda_1}|1\rangle_{\lambda_2}).$$

Here, the symbols $\lambda_1$ and $\lambda_2$ represent the nondegenerate wavelengths of photons forming a pair and the vectors $|0\rangle$ and $|1\rangle$ are associated with ordinary polarization of the first and the second crystal, respectively. A relative phase $\varphi$ is determined by the details of phase-matching in the nonlinear crystals 21 and 22. The wavelengths $\lambda_1$ and $\lambda_2$ are mapped onto two distinct spatial modes, in the following represented by the symbols 1 and 2, using the wavelength division multiplexer 28. Thus, the quantum state of fluorescence photons guided in the single-mode optical fibres 29, 30 is $$|\phi(\varphi)\rangle = \frac{1}{\sqrt{2}}(|0\rangle_1|0\rangle_2 + e^{i\varphi}|1\rangle_1|1\rangle_2).$$

The value of relative phase $\varphi$ can be easily controlled by the birefringent compensation element 23 and therefore two of the maximally entangled two-qubit states (or Bell states)—

$$|\phi^\pm\rangle = \frac{1}{\sqrt{2}}(|0\rangle_1|0\rangle_2 \pm |1\rangle_1|1\rangle_2)$$

—can be directly obtained. Additionally, if the polarization of one of the photons is transformed to the orthogonal polarization, the remaining two Bell states—

$$|\Psi^\pm\rangle = \frac{1}{\sqrt{2}}(|0\rangle_1|1\rangle_2 \pm |1\rangle_1|0\rangle_2)$$

—can be generated.

Due to the birefringent nature of down-conversion crystals the photons created in the first crystal 21 are laterally displaced with regard to photons created in the second one 22. This spatial effect does not lead to a degradation of polarization entanglement as the fluorescence photons emitted from the crystals belong to the same spatial optical mode determined by single-mode fibre 26. The displacement causes only a degradation of the coupling efficiency of fluorescence photons into the single-mode fibre. This effect can be optimally compensated by using two crystals 33, 34, identical to the down-conversion crystals, but only half as long. This additional birefringent material in the path of the fluorescence photons can be also used to set a relative phase shift $\varphi$ in the state $|\Phi(\varphi)\rangle$ to any desired value.

The novelty of the source lies in choosing the wavelength difference of photons forming the entangled pair (a) big enough so that state-of-the-art dichroic devices are available to split the different wavelengths with high switching ratio and (b) small enough that the spatial optical modes of both wavelengths are identical, i.e. they can for example propagate in the same optical single-mode fiber. This combination brings manifold advantages over the methods of the prior art. First, the fluorescence photons cannot carry, even in principle, any spatial information whatsoever, which would make $|0\rangle_1|0\rangle_2$ and $|1\rangle_1|1\rangle_2$ terms in $|\Phi(\varphi)\rangle$ distinguishable. Thus, the disclosed method is not accompanied by any intrinsic spatial effects reducing the quality of the entanglement. Moreover, due to collinear configuration, the quantum interference visibility is independent on the length of the nonlinear material. Therefore, very long crystals can be employed and a high photon-pair flux can be obtained. Finally, collecting the fluorescence photons into the only single-mode fibre reduces significantly technical requirements and simplifies tremendously the alignment.

Figure 3:
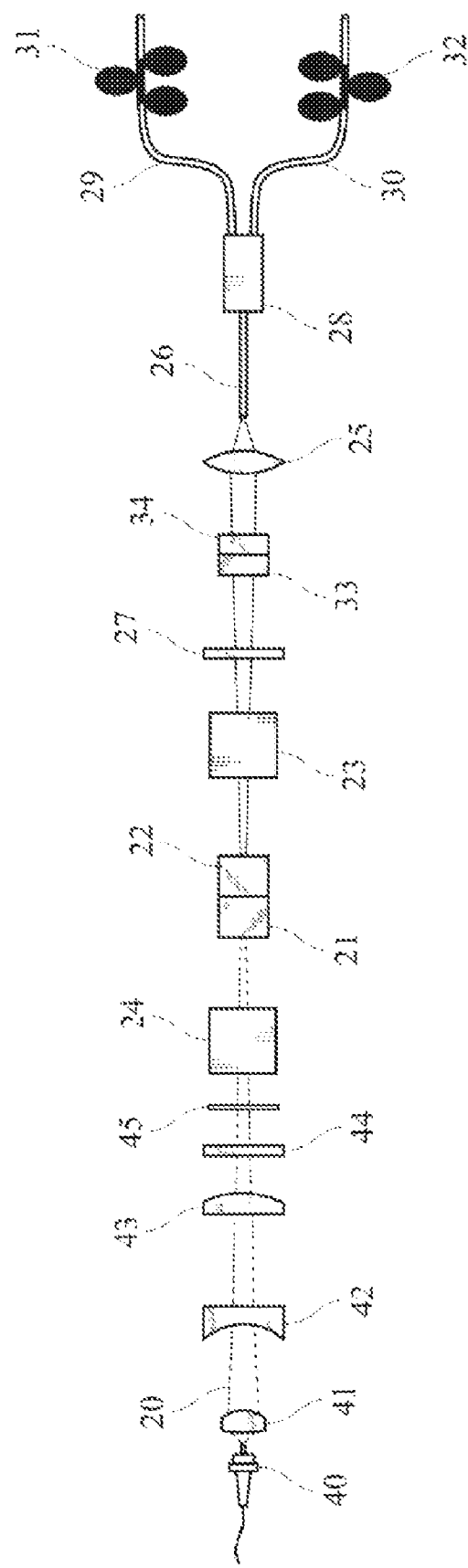
FIG. 3 illustrates one embodiment of the apparatus of the present invention.

Referring now to FIG. 3, there is shown a schematic diagram of the experimental setup for the generation of polarization-entangled photon pairs at nondegenerate wavelengths in accordance with the present invention. In one embodiment, the source of linearly polarized pump light 20 is, in order to reduce the costs and size of the apparatus, conveniently provided by a laser diode 40 operating at the wavelength 402.5 nm and having maximum output power of 60 mW. The strongly divergent light from the laser diode is focused using a telescope consisting of an aspheric lens 41 (focal length f=4 mm) and a negative singlet lens 42 (f=−25 mm). The elliptical profile of the pump beam is compensated using an additional cylindrical lens 43 (f=150 mm). A filter 44 having a high transmission at the pump wavelength of 402.5 nm and blocking the residual light at the double wavelength emitted from the laser diode, is put into the path of the pump beam. A half-wave plate 45 is used to adjust the angle of the linear polarization of the pump beam.

Two nonlinear BBO (β-BaB$_2$O$_4$) crystals 21, 22, both with a size of 6.0×6.0×15.76 mm and cut for type-I phase matching at $\theta_p$=29.0°, are placed approximately at the waist position of the pump beam. The crystals are oriented such that the optic axes of the first and second crystal lie in the vertical and horizontal plane emitting pairs of horizontally and vertically polarized fluorescence photons, respectively. By suitably tilting the crystals, the fluorescence photons at non-degenerate wavelengths centered on $\lambda_1$~765 nm and $\lambda_2$~850 nm are collinearly emitted.

Due to dispersion in crystals 21, 22, the vertically polarized photons generated in the second crystal are delayed with respect to horizontally polarized photons from the first crystal. The situation is even more complicated as we deal with nondegenerate wavelengths having different group velocities in the crystals. To counteract the effect completely, the combination of two compensation yttrium vanadate crystals 23 and 24 with optimized thicknesses is employed. The first crystal 24 with the thickness of 9.03 mm is put into the path of pump beam and the second crystal 23 with the thickness of 8.20 mm is placed into the path of fluorescence photons. The cut of both crystals is at 90 degrees suppressing the occurrence of any residual spatial "walk-off" effects. To compensate the lateral displacement of the horizontally and vertically polarized photons, the fluorescence photons pass through the additional pair of BBO crystals 33, 34 (6.0×6.0×7.88 mm) with the cut identical to the crystals 21 and 22. The longpass filter 27 with a high transmission at near-infrared spectral range blocks the violet pump light. An aspheric lens 25 with a focal length of f=7.5 mm is used to collect the fluorescence photons emitted from the down-conversion crystals 21, 22 into the single-mode fibre 26. The photons are directly guided to the wavelength division multiplexer 28, where the photons at $\lambda_1$ and $\lambda_2$ are split with a probability of about 99% into two single-mode fibres 29, 30. The photons in the fibres 29, 30 from a pair are in maximally entangled polarization state $$|\phi(\varphi)\rangle = \frac{1}{\sqrt{2}}(|H\rangle_1|H\rangle_2 + e^{i\varphi}|V\rangle_1|V\rangle_2),$$

where the symbols H and V represent the horizontal and vertical polarization, respectively. To compensate the birefringence of fibres 29, 30 and the polarization effect of wavelength division multiplexer 28, the fibres are provided with the polarization controllers 31 and 32.

Next, some principles and aspects of operation of the embodiment from FIG. 3 will be described by using FIGS. 4-7.

Figure 4:
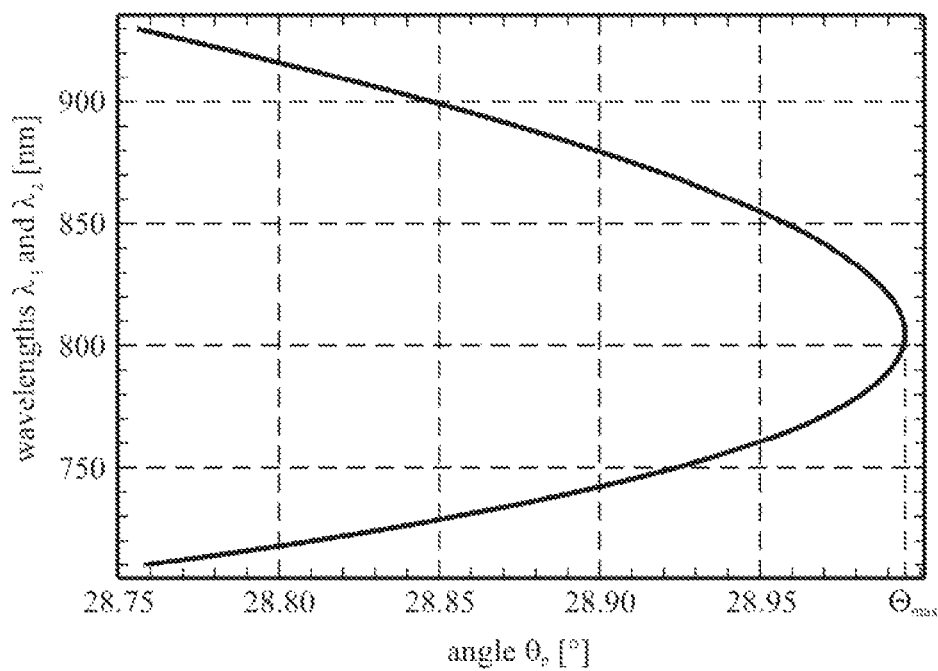
FIG. 4 is a diagram showing the relationship between the phase-matched fluorescence wavelengths and the orientation of the nonlinear crystal for the case of collinear emission according to one embodiment of the present invention.

FIG. 4 is the diagram showing the dependency of the phase-matched fluorescence wavelengths $\lambda_1$ and $\lambda_2$ on the angle $\theta_p$, between the optic axis and the propagation of pump light, calculated for BBO crystals 21, 22 from FIG. 3 with the assumption of collinear emission. The FIG. 4 demonstrates that for certain values $\theta_p$, indeed photons with nondegenerate wavelengths are collinearly emitted from the crystal. The limiting value $\Theta_{max}$ corresponds to the degenerate emission of photons at the double wavelength of the pump beam, i.e. at $\lambda_1=\lambda_2=2\lambda_p$. By changing the value of $\theta_p$, which is physically realized by tilting of the nonlinear crystals 21 and 22, the photons at any desired nondegenerate wavelengths are obtained.

Figure 5:
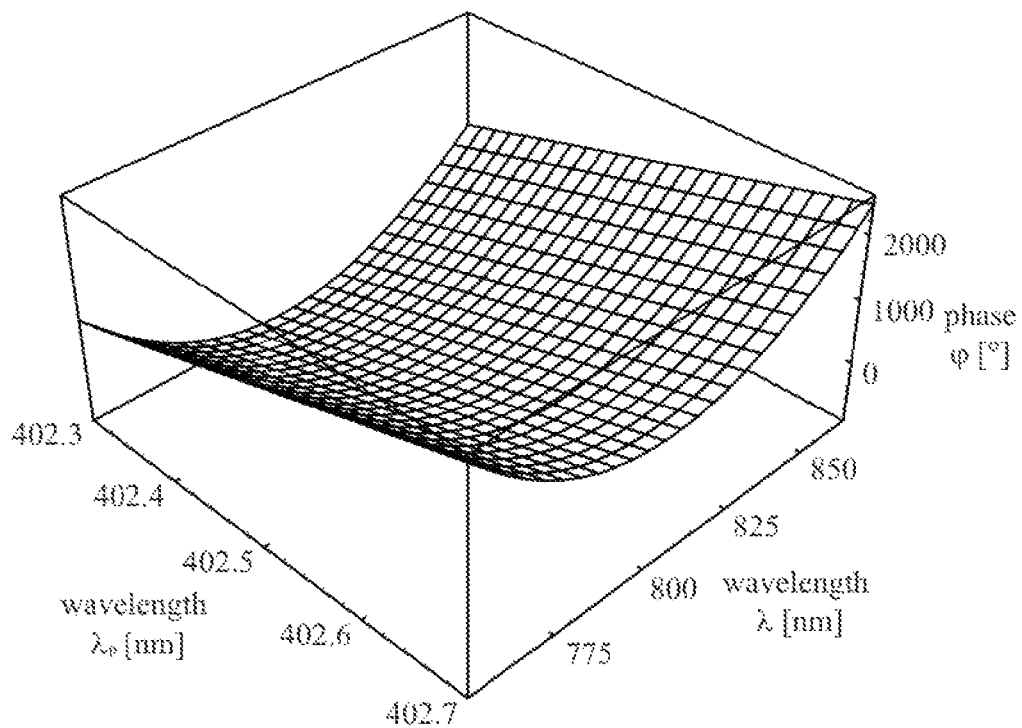
FIG. 5 is a diagram showing the relationship between the relative phase in two-photon polarization state on the wavelengths of pump and fluorescence photons in the case where dispersion is not compensated and fluorescence photons are distinguishable in time.

FIG. 5 is the diagram showing the dependency of the relative phase φ in the quantum state $$|\phi(\varphi)\rangle = \frac{1}{\sqrt{2}}(|H\rangle_1|H\rangle_2 + e^{i\varphi}|V\rangle_1|V\rangle_2),$$

of the photon pairs emitted from the crystals 21, 22 in the apparatus illustrated in FIG. 3 and not including the compensation crystals 23, 24, on the wavelengths of pump and fluorescence photons. An overall phase offset has been suppressed for clarity in FIG. 5. The following argument might be used to determine the relative phase φ: both |H⟩|H⟩ and |V⟩|V⟩ terms in |Φ(φ)⟩ receive an equal ordinary phase in the crystals, where they are created. Therefore, these phases can be neglected as a global phase. Besides, the |H⟩|H⟩ term originated in the first crystal receive an additional extraordinary phase in the second crystal equaling to $$\frac{2L\pi}{\lambda}n_e(\theta_p, \lambda) + \frac{2L\pi(\lambda - \lambda_p)}{\lambda\lambda_p}n_e\left(\theta_p, \frac{\lambda\lambda_p}{\lambda - \lambda_p}\right), \quad (1)$$

and the |V⟩|V⟩ term originated in the second crystal receive an additional ordinary phase, $$\frac{2L\pi}{\lambda}n_o(\lambda_p), \quad (2)$$

which is given by the propagation of the pump photon in the first crystal. In the expressions (1) and (2), λ is the wavelength of one of the fluorescence photons, $\lambda_p$ is the wavelength of pump photon, L is the length of either crystal, $\theta_p$ the angle between the optic axis and the propagation direction of pump beam, $n_o$ is the ordinary refraction index and $n_e$ is the extraordinary refraction index. The difference of the expressions (1) and (2) determines the relative phase φ=φ(λ,$\lambda_p$), up to irrelevant constant phase factors. As demonstrated in FIG. 5, the relative phase φ shows a strong dependence on both the wavelength of pump light and the wavelength of fluorescence photons. This effect caused by the birefringence and the dispersion in the nonlinear crystals effectively reduces the quality of the produced polarization entanglement. To compensate the effect, the additional birefringence material with the completely opposite dispersion characteristics from the one shown in FIG. 5 must be included in the apparatus.

Figure 6:
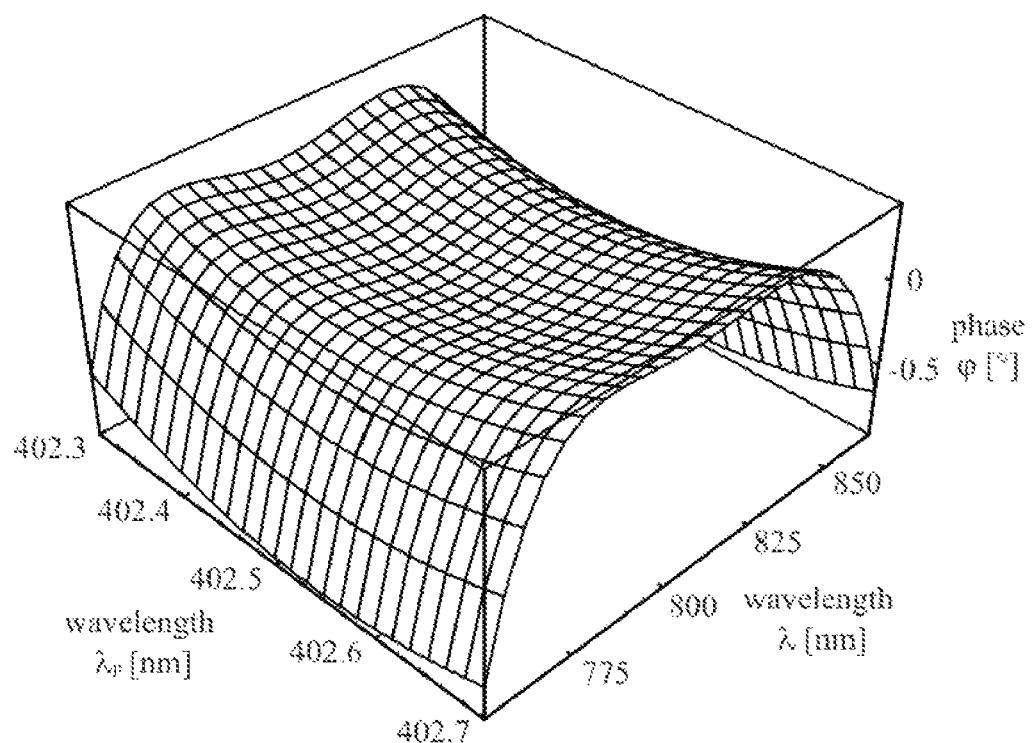
FIG. 6 is a diagram showing the relationship between the relative phase in two-photon polarization state on the wavelengths of pump and fluorescence photons in the case where dispersion is compensated and fluorescence photons are not distinguishable in time.

FIG. 6 is the diagram showing the dependency of the relative phase φ in the quantum state $$|\phi(\varphi)\rangle = \frac{1}{\sqrt{2}}(|H\rangle_1|H\rangle_2 + e^{i\varphi}|V\rangle_1|V\rangle_2),$$

of the photon pairs emitted from the crystals 21, 22 in the apparatus illustrated in FIG. 3 and including the compensation crystals 23, 24, on the wavelengths of pump and fluorescence photons. An overall phase offset has been suppressed for clarity in FIG. 6. After the compensation, the dependency $\phi(\lambda, \lambda_p)$ is flat over a broad wavelength range, representing the time indistinguishability of the fluorescence photons.

Experimentally, for the detection of fluorescence photons, generated in the apparatus of FIG. 3, two standard actively quenched silicon avalanche photodiodes with a detection efficiency of ~50% at 800 nm were used. The outputs of detectors were recorded directly, obtaining the single count rates, as well as in coincidence with the gate time of about 5 ns. A photon pair flux of about 25000 per second and milliwatt of pump power was detected. For the maximum output power of 60 mW of the laser diode 40, this implies a coincidence count rate of ~$10^6$ per second. A coincidence-to-single count ratio of 37% was observed, thereby confirming high coupling efficiency of photons into single-mode fibre 26.

Figure 7:
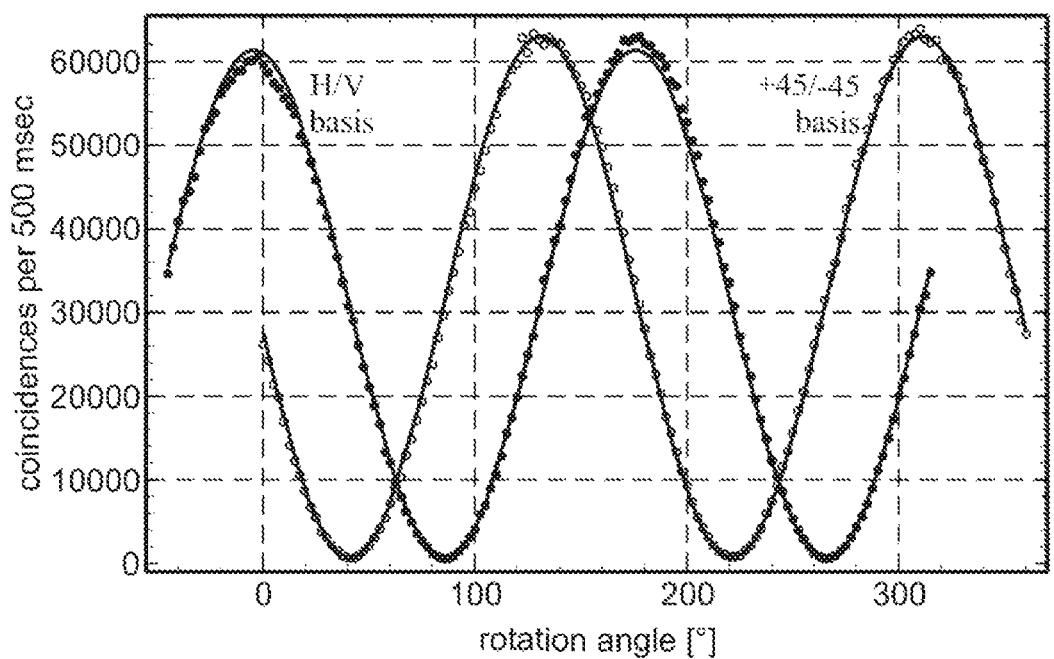
FIG. 7 illustrates the measurement of the polarization correlations in two conjugate bases, namely in horizontal/vertical basis and the basis rotated by 45° degrees, serving for quantifying the degree of polarization entanglement produced by the apparatus of FIG. 3.

To verify the entanglement of the photon pairs the degree of polarization correlations in two mutually non-orthogonal bases was measured using. This was done by passing the fluorescence photons through a pair of rotatable polarizers placed in front of the avalanche photodiodes. In FIG. 7 expected sinusoidal dependence of the measured coincidence count rate on the rotation angle of one polarizer, while keeping the other one fixed at 0 degree and at 45 degree, is shown. For both settings, corresponding to a detection of photons in horizontal/vertical basis and the basis rotated by 45° degrees, i.e. the +45°/−45°-basis, nearly perfect visibility of 98-99% was observed.

The foregoing description of the embodiments of the invention has been presented for purposes of illustration. It is not intended to be exhaustive or to limit the invention to the precise form disclosed, and obviously many modifications and variations are possible in light of the above description. The scope of the invention is defined by the claims appended hereto.

The invention claimed is:

1. Apparatus for producing quantum correlated and/or polarization entangled photon pairs, said apparatus, comprising:
   an entangled photon pair generator producing polarization-entangled photon pairs, which consist of photons at nondegenerate wavelengths;
   a device defining a spatial optical mode of said polarization-entangled photon pairs;
   wherein the said nondegenerate wavelengths of photons forming said polarization-entangled photon pairs are such that their efficient propagation through said device is possible.

2. The apparatus according to claim 1 and further comprising a dichroic device separating the photons with said nondegenerate wavelengths into distinct spatial modes, wherein the said nondegenerate wavelengths of photons from said polarization-entangled photon pairs are such that their efficient separation is possible.

3. The apparatus according to claim 2, wherein a dichroic device separating the photons with said nondegenerate wavelengths into distinct spatial modes is a wavelength division multiplexer.

4. The apparatus according to claim 2, wherein a dichroic device separating the photons with said nondegenerate wavelengths into distinct spatial modes contains a dispersive optical element.

5. The apparatus according to claim 1, wherein said entangled photon pair generator comprises:
   a photon pair source producing pairs of photons, which have nondegenerate wavelengths and are correlated;
   a control providing means for the adjustment of the phase and/or time relation between photons produced by said photon pair source.

6. The apparatus according to claim 5, wherein said photon pair source comprises:
   a source of pump light;
   a nonlinear optical medium on which said pump light is incident;
   a filtering component to isolate the said photon pairs from said pump light.

7. The apparatus according to claim 6, wherein said source of pump light comprises a laser diode.

8. The apparatus according to claim 6, wherein the mutual space orientation between the said nonlinear optical medium and the direction of said pump light satisfies the condition for collinear emission of said photon pairs.

9. The apparatus according to claim 6, wherein said nonlinear optical medium comprises at least two adjacent nonlinear crystals oriented such that the principle planes of said crystals form a predetermined angle.

10. The apparatus according to claim 5, wherein said control comprises a time delay component for establishing complete time indistinguishability of photons produced by said photon pair source, and/or a phase control component for producing a phase delay between photons produced by said photon pair source.

11. The apparatus according to claim 1, wherein said device defining a spatial optical mode comprises an optical fibre.

12. The apparatus according to claim 11, further comprising means of matching the spatial distribution of said polarization-entangled photon pairs into a spatial optical mode of said optical fibre.

13. The apparatus according to claim 1, wherein the device defining a spatial optical mode comprises a spatial filter assembly.

14. A method of producing quantum correlated and/or polarization entangled photon pairs, comprising the steps of:
   producing polarization-entangled photon pairs consisting of photons at nondegenerate wavelengths;
   defining a spatial optical mode of said polarization-entangled photon pairs;
   wherein the said nondegenerate wavelengths of photons forming said polarization-entangled photon pairs are such that their efficient propagation in the said spatial optical mode is possible.

15. A method according to claim 14, further comprising the step of separating the photons with said nondegenerate wavelengths into distinct spatial modes, wherein the said nondegenerate wavelengths of photons from said polarization-entangled photon pairs are such that their efficient separation is possible.

* * * * *